United States Patent [19]

Schmidt

[11] 4,335,764
[45] Jun. 22, 1982

[54] VENEER PEELING APPARATUS

[76] Inventor: Charles J. Schmidt, P.O. Box 757, Diboll, Tex. 75941

[21] Appl. No.: 217,272

[22] Filed: Dec. 17, 1980

[51] Int. Cl.$^3$ ............................................. B27L 5/02
[52] U.S. Cl. .......................... 144/209 R; 144/209 A; 144/365
[58] Field of Search ............... 82/38 R, 39, 45, 83, 82/91, 101; 144/209 R, 213, 242 B, 246 R, 246 F, 325, 209 A

[56] References Cited

U.S. PATENT DOCUMENTS 1,951,834  3/1934  McCarroll ........................... 144/209
4,073,326  2/1978  Pank et al. ........................... 144/209

*Primary Examiner*—W. D. Bray
*Attorney, Agent, or Firm*—Fulbright & Jaworski

[57] ABSTRACT

A veneer peeling apparatus having a fixed rotatable roller and a cutting knife. First and second movable rollers are positioned below the first roller. The first and second rollers are movable toward and away from the fixed roller and each other. Rotating means are connected to both ends of each of the rollers thereby rotating a log positioned between the rollers and against the knife. An automatic log feeding trough leads to a position between the fixed roller and above the first roller whereby a log automatically moves between all of the rollers when the movable rollers are retracted. The first roller includes flanges at each end limiting lateral movement of a log. The speed of rotation of the surface of the fixed roller is slower than the speed of rotation of the surfaces of the movable rollers. A plurality of space support bearings support each of the movable rollers along their lengths allowing the use of smaller rollers which can move closer to each other to move veneer. A plurality of support bearings are positioned along the fixed roller including bearings having ends angled relative to the longitudinal axis of the fixed roller for wiping debris off of the fixed roller.

12 Claims, 4 Drawing Figures

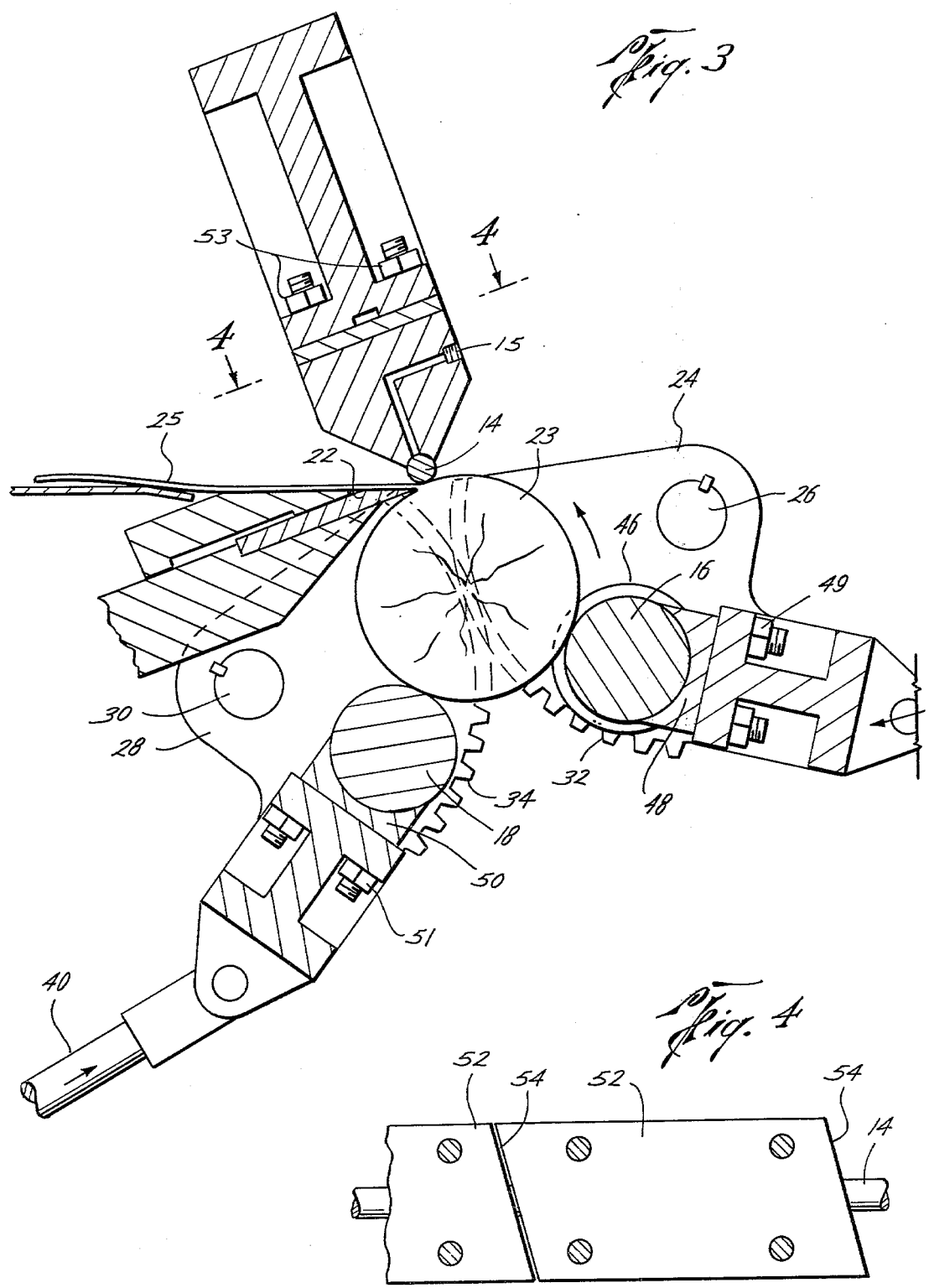

VENEER PEELING APPARATUS

BACKGROUND OF THE INVENTION

It is old to provide a centerless veneer lathe as disclosed in U.S. Pat. Nos. 1,951,834 and 4,073,326 for producing additional veneer from wood cores than from conventional veneer lathes. However, there is no known satisfactory centerless veneer peeling apparatus on the market which satisfactorily performs, and which can be used to peel logs or cores as long as eight feet or longer.

The present invention is directed to a centerless veneer peeling apparatus having various improvements which will automatically produce additional veneer from wood logs.

SUMMARY

The present invention is directed to a veneer peeling apparatus for horizontally holding and rotating a wood log and peeling veneer off of the log. The apparatus includes a fixed rotatable roller positioned above the longitudinal axis of the log with a cutting knife positioned adjacent the fixed roller for peeling veneer from the log. First and second movable rollers are positioned below the fixed roller and preferably the first roller is positioned above the second roller with the first and second rollers movable toward and away from the fixed roller. The movable rollers are positioned equal distances from the fixed roller at all times. All of the rollers have horizontal, longitudinal axes parallel to each other. Means are provided for rotating all of the rollers, and preferably rotating both ends of all of the rollers for providing an even driving torque against a log positioned therebetween.

Still a further object is the provision of an automatic logfeeding trough having a ramp leading to a position between the fixed roller and above the first roller whereby a log automatically moves between all of the rollers when the movable rollers are retracted.

Still a further object of the present invention is the provision of a flange at each end of the first roller for engaging the ends of a log and limiting lateral movement of the log relative to the rollers.

A still further object of the present invention is the provision of rotating the surface of the fixed roller slower than the surfaces of the movable rollers thereby aiding in peeling of the log.

Still a further object of the present invention is the provision of a plurality of spaced support bearings supporting each of the movable rollers along their lengths to provide an even driving force on the log. In addition, the use of spaced support bearings allow the use of smaller rollers which can move closer to each other for removing as much of the wood from the log as possible.

Yet a still further object is the provision of a plurality of support bearings positioned along the fixed roller in which the support bearings including ends angled relative to the longitudinal axis of the fixed roller for wiping debris off of the fixed roller.

Yet a still further object of the present invention is the provision wherein the first and second rollers include knurled or resiliently coated surfaces for gripping a log and the fixed roller includes a substantially smooth surface.

Other and further objects, features and advantages will be apparent from the following description of a presently preferred embodiment of the invention given for the purpose of disclosure and taken in conjunction with the accompanying drawings.

BRIEF DESCRIPTION OF THE DRAWINGS

FIG. 3 is an enlarged cross-sectional view of a portion of FIG. 3 showing the apparatus peeling a layer of veneer from a log, and FIG. 4 is a cross-sectional view taken along the line 44 of FIG. 3.

DESCRIPTION OF THE PREFERRED EMBODIMENT

Figure 1:
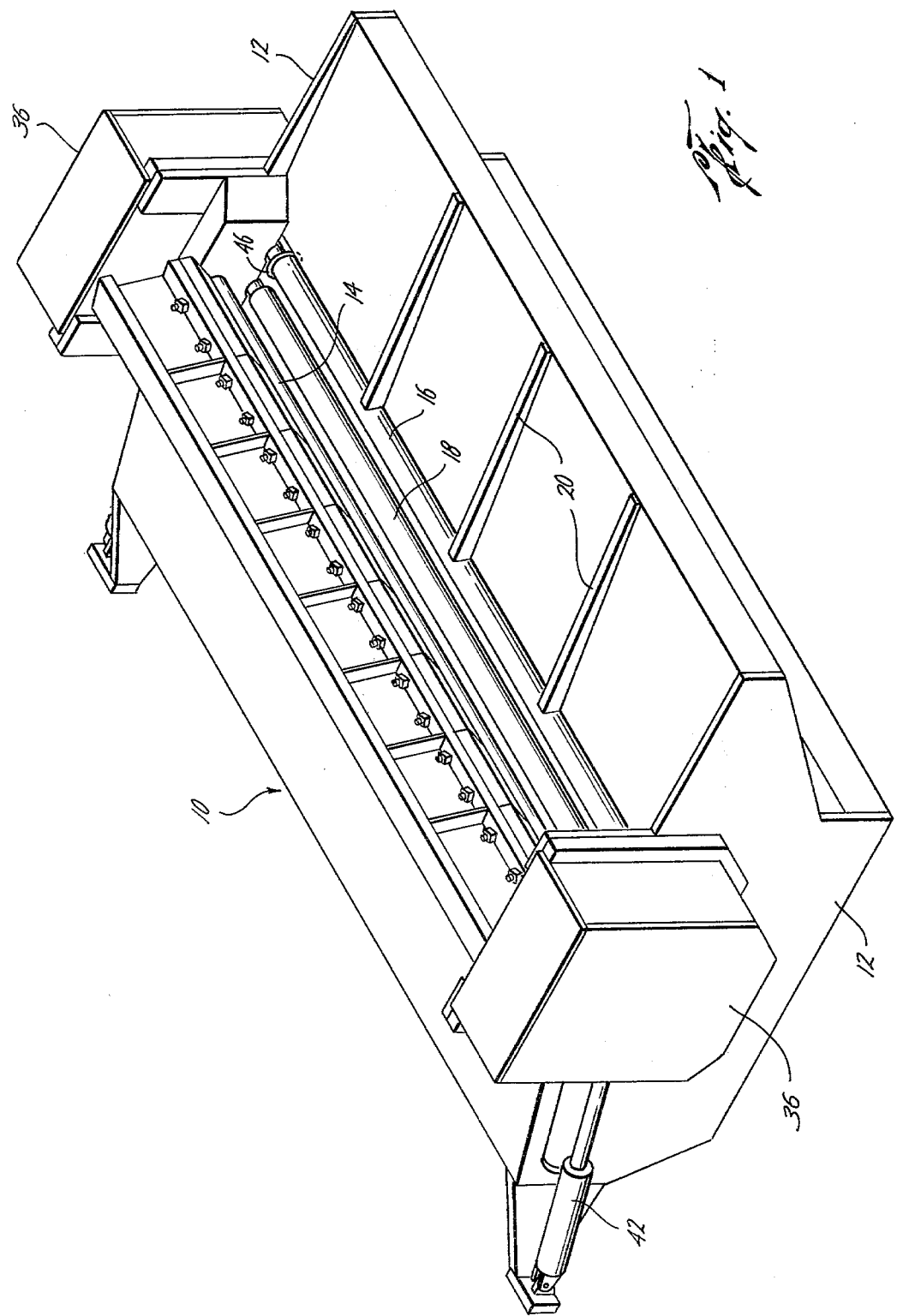
FIG. 1 is a perspective view of the veneer peeling apparatus of the present invention.

Referring now to the drawings, particularly to FIG. 1, the reference numeral 10 generally indicates the veneer peeling apparatus of the present invention and generally includes a frame 12, a fixed position roller 14, first and second movably positioned rollers 16 and 18, and an automatic log in-feeding trough or table 20.

Figure 2:
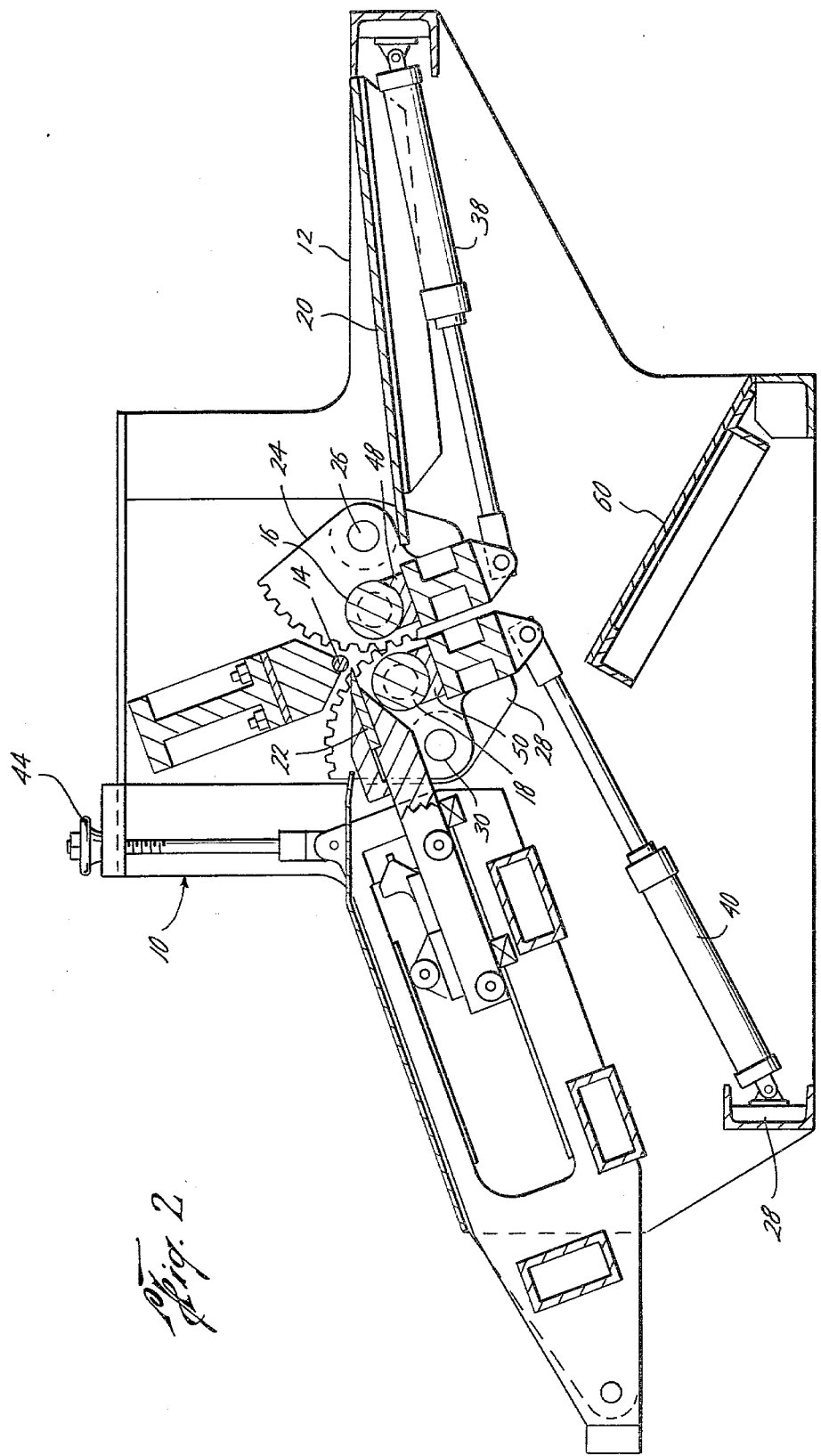
FIG. 2 is a cross-sectional view of the apparatus of FIG. 1 without a log.

Referring now to FIGS. 2 and 3, a knife 22 is positioned adjacent the fixed roller or nose bar 14 for peeling a desired thickness of veneer from a rotating log 23. The fixed position roller 14 is positioned above the longitudinal axis of the log 23. The first movable roller 16 and the second movable roller 18 are positioned below the first roller 14 with the first roller 16 being positioned at a higher elevation than the second roller 18. The first movable roller 16 is supported from end supports 24 which pivot around pivot shaft 26 whereby the first movable roller 16 may move toward the fixed roller 14 and be retracted therefrom. Similarly, the second movable roller 18 is supported by end supports 28 which are adapted to rotate around movable pivot 30. Suitable timing means such as gears 32 and 34 on the supports 24 and 28, respectively, suitably position the first roller 16 and the second roller 18 equal distances from the fixed roller 14 at all times.

Suitable and conventional driving means are provided in the end cases 36, such as powered gears or chains for rotating all of the rollers 14, 16 and 18 at both ends of the rollers. This insures that a steady and constant torque is applied along the exterior of the log 23 for rotating the log 23 and cutting a strip of veneer 25 therefrom as the knife 22 engages the rotating log 23. Preferably, the speed of rotation of the surface of the fixed roller 14 is slower than the speed of rotation of the surfaces of the movable rollers 16 and 18, for example, one percent (1%) slower. This aids in the peeling of the log since the slower fixed roller 14 tends to stretch the outer periphery of the log 23 adjacent the knife 22 allowing a better cutting action to occur.

Referring to FIGS. 2 and 3 hydraulic piston and cylinder assemblies 38 and 40 are connected between the frame 12 and the end supports 24 and 28 and when extended move the first and second rollers 16 and 18 toward the fixed roller 14 and when retracted retract the first and second rollers 16 and 18.

Referring to FIG. 1, a piston and cylinder assembly 42 is provided between each end of the frame 12 and the knife 22 holding assembly for holding the knife 22 in position. Referring to FIG. 2, a nut 44 is provided for adjusting the thickness of the cut of the veneer 25 by the knife 22.

Referring to FIGS. 1 and 3, the first movable roller 16 includes flanges 46 at both ends for limiting lateral movement of a log 23 relative to the rollers thereby maintaining the log longitudinally positioned in the apparatus 10.

Preferably, the first and second rollers 16 and 18 include knurled or resiliently coated surfaces such as rubber for more securely gripping a log 23 while the fixed roller 14 includes a substantially smooth surface which will not mar the veneer strip 25.

Referring to FIG. 2 a plurality of support bearings 48 are provided spaced along the length of the first roller 16 in order to fully support the roller 16 for engaging the log 23 along its entire contacting surface. Similarly, a plurality of support bearings 50 support the movable roller 18 along its length. In addition, the support bearings 48 and 50 allow the use of smaller sized rollers 16 and 18 which can move close to each other to peel as much veneer from the log 23 as possible and peeling more veneer than other lathes.

Referring now to FIG. 4, the fixed roller 14 is supported by a plurality of support bearings 52, preferably water lubricated through inlet 53 positioned along the entire top length of the fixed roller 14 in which the bearings 52 include ends 54 which are angled to the longitudinal axis of the fixed roller 14. Therefore, as the roller 14 rotates the bearings 54 and water will wipe debris off of the fixed roller 14 and tend to dispose of it. If the ends 54 were perpendicular to the axis, debris would build up therein and possibly adversely affect the contact of the roller 14 with the log 23.

Without the bearings 48, 50 and 52 the rollers 16, 18 and 14 would have to be of a greater diameter size to support themselves and grip the log 23 along its length. However, larger sized rollers 16, 18 and 14 could not move as close to each other as small sized rollers and thus could not peel extra veneer from the log 23 as can smaller sized rollers with the noted bearing arrangement. Furthermore, each bearing segment includes an adjusting mechanism for providing proper driving capability and uniform thickness of the veneer 25. Thus bearings 48, 50 and 52 include adjusting nuts 49, 51 and 53, respectively.

In operation, with the apparatus positioned as in FIG. 2, the hydraulic piston and cylinder assemblies 38 and 40 are actuated to retract the first and second rollers 16 and 18 from the fixed roller 14. This moves the first roller 16 downwardly relative to the infeed trough or table 20 allowing the next log to roll into position between the rollers 14, 16 and 18. The hydraulic piston and cylinder assemblies 38 and 40 are extended, and rotated in as best seen in FIG. 3, to rotate the log 23 and hold it adjacent the fixed roller 14 so that the knife 22 cuts a uniform thickness of veneer 25. The movable rollers 16 and 18 continue their uniform and equal distance movement towards the fixed roller 14 as the log 23 becomes smaller in size. When the veneer has been peeled from the log 23, the piston and cylinder assemblies 38 and 40 are retracted to allow the spent core to fall downwardly between the rollers 16 and 18 onto a chute 60 where they are ejected from the apparatus 10. Further retraction of the rollers 16 and 18 will again allow another log to roll from the feeding table 20 into position and the operation continues.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

What is claimed is:

1. A veneer peeling apparatus for peeling veneer off of wood logs comprising, a fixed rotatable roller, a cutting knife positioned adjacent the fixed roller for peeling veneer from a log, first and second movable rollers positioned below the fixed roller, said first and second rollers movable toward and away from the fixed roller and each other, means for rotating all of said rollers thereby rotating a log positioned between the rollers and against the knife, an automatic log feeding trough having a ramp leading to a position between the fixed roller and above one of the movable rollers whereby a log moves between all of the rollers when the movable rollers are retracted.

2. The apparatus of claim 1 wherein the one movable roller includes a flange at each end limiting lateral movement of a log relative to the rollers.

3. The apparatus of claim 1 wherein the speed of rotation of the surface of the fixed roller is slower than the speed of rotation of the surfaces of the movable rollers thereby aiding the peeling of the log.

4. The apparatus of claim 1 including, a plurality of spaced support bearings supporting each of the movable rollers along their lengths thereby allowing the use of smaller rollers which can move close together and peel more veneer.

5. The apparatus of claim 1 including, a plurality of support bearings positioned along the fixed roller, said fixed roller bearings including ends angled relative to the longitudinal axis of the fixed roller for wiping debris off of the fixed roller.

6. A veneer peeling apparatus for peeling veneer off of a horizontally positioned and rotating wood log comprising, a fixed rotatable roller positioned to be above the longitudinal axis of the log, a cutting knife positioned adjacent the fixed roller for peeling veneer from a log, first and second movable rollers positioned below the first roller, the first roller being positioned above the second roller, said first and second rollers movable toward and away from the fixed roller and each other, said movable rollers being positioned equidistance from the fixed roller at all times, all of said rollers having horizontal longitudinal axis parallel to each other, means for rotating all of said rollers at both ends thereby rotating a log positioned between the rollers and against the knife, an automatic log feeding trough having a ramp leading to a position between the fixed roller and above said first roller whereby a log moves between all of the rollers when the movable rollers are retracted.

7. The apparatus of claim 6 including, a plurality of spaced support bearings supporting each of the movable rollers along their lengths thereby allowing the use of smaller rollers which can move closer together and peel more veneer.

8. The apparatus of claim 7 wherein the first and second rollers include knurled surfaces for gripping a log and the fixed roller includes a substantially smooth surface.

9. The apparatus of claim 8 wherein the speed of rotation of the surface of the fixed roller is slower than the speed of rotation of the surfaces of the movable rollers thereby aiding the peeling of the log.

10. The apparatus of claim 9 wherein the first movable roller includes a flange at each end limiting lateral movement of a log relative to the rollers.

11. The apparatus of claim 7 wherein the first and second rollers include resilient surfaces for gripping a log and the fixed rollers includes a substantially smooth surface.

12. A veneer peeling apparatus for peeling veneer off of a horizontally positioned wood log comprising, a fixed rotatable roller positioned to be above the longitudinal axis of the log, a cutting knife positioned adjacent and below the fixed roller for peeling veneer from a log, first and second movable rollers positioned below the first roller, the first roller being positioned above the second rollers, said first and second rollers movable toward and away from the fixed roller and each other, said movable rollers being positioned equidistance from the fixed roller at all times, all of said rollers having horizontal longitudinal axis parallel to each other, means for rotating all of said rollers at both ends thereby rotating a log positioned between the rollers and against the knife, the speed of rotation of the surface of the fixed roller being slower than the speed of rotation of the surfaces of the movable rollers, and said first movable roller including a flange at each end limiting lateral movement of a log relative to the rollers.

* * * * *